United States Patent [19]

Behnke

[11] Patent Number: 4,542,261
[45] Date of Patent: Sep. 17, 1985

[54] DIGITIZING STYLUS

[75] Inventor: Gert Behnke, Hamburg, Fed. Rep. of Germany

[73] Assignee: Aristo Graphic Systeme GmbH & Co. KG, Hamburg, Fed. Rep. of Germany

[21] Appl. No.: 523,259

[22] Filed: Aug. 15, 1983

[30] Foreign Application Priority Data

Aug. 14, 1982 [DE] Fed. Rep. of Germany ... 8222962[U]

[51] Int. Cl.$^4$ .............................................. G08C 21/00
[52] U.S. Cl. ...................................... 178/18; 362/118
[58] Field of Search ............................. 178/18, 19, 20; 340/707, 708, 709, 710; 362/118, 119

[56] References Cited

U.S. PATENT DOCUMENTS

| 1,418,132 | 5/1922 | Devine | 362/118 |
| 3,886,311 | 5/1975 | Rodgers et al. | 178/18 |
| 4,034,155 | 7/1977 | Muller et al. | 178/19 |
| 4,158,747 | 6/1979 | Muller et al. | 178/19 |
| 4,263,592 | 4/1981 | Takahashi | 178/18 |
| 4,268,730 | 5/1981 | Higgins | 178/18 |
| 4,289,927 | 9/1981 | Rodgers | 178/19 |

FOREIGN PATENT DOCUMENTS

| 1239558 | 7/1971 | United Kingdom . |
| 1302986 | 1/1973 | United Kingdom . |

Primary Examiner—Stafford D. Schreyer
Attorney, Agent, or Firm—David H. Semmes; Warren E. Olsen

[57] ABSTRACT

A digitizing stylus which generates a pulse that is not dependent upon the spatial displacement of the contacting pin, embodied in accordance with the invention so that the toroid coil can be moved axially, together with the contacting pin. This preferably is attained by providing that the contacting pin and the toroid coil are integrally cast in plastic, and the plastic body thereby formed has an extension on its inner end which extends to interconnect with an actuation body that is held within the shaft of the digitizing stylus, in an axially movable manner. Excitation of the toroid coil is triggered by the displacement of the actuation member, and a constant amplitude pulse will occur because no movement occurs between the contact pin and the toroid coil.

4 Claims, 2 Drawing Figures

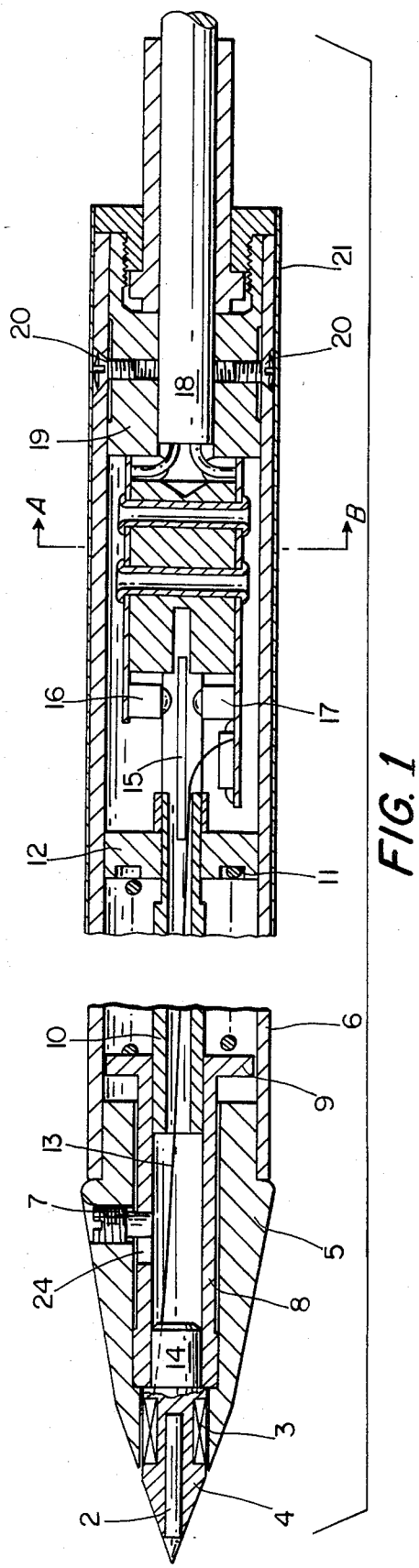
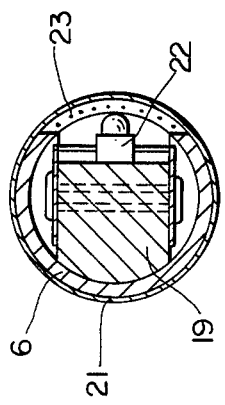
FIG. 1
FIG. 2

DIGITIZING STYLUS

BACKGROUND OF THE INVENTION

1. Field of the Invention

The invention relates to a digitizing stylus having a contacting pin of ferromagnetic material. Such contacting pins can be moved into the shaft of the stylus against a spring force, this movement being limited in the axial direction, and with an inner end region oriented toward the shaft, it extends into or through the center opening of a toroid coil, and is coupled with a switching device. As the contacting pin moves into the shaft, this switching device closes a circuit of exciter current for the toroid coil.

2. Brief Description of the Prior Art

Digitizing styli of this kind are used in order to perform a digital storage of illustrations with the aid of so-called digitizing tablets which have a fine-meshed wire grid. The contacting pin of the digitizing stylus is pressed against a point of a drawing located on the digitizing tablet to be stored in memory, causing the displacement of the contacting pin into the shaft of the digitizing stylus, which in turn causes the contacting pin to generate a switching signal. As a consequence of the switching signal, a magnetic field is generated in order to fix a point on the surface of the digitizing tablet, the field originating with either the coil or the wire grid of the digitizing tablet. In the first instance, the toroid coil acts as a transmitter; in the second, it acts as a receiver. If the toroid coil is considered to be the transmitter coil, then with an exciter current flowing through the coil a magnetic field is generated which is carried by the ferromagnetic contacting pin in such a way that at the corresponding point of the wire grid of the digitizing tablet, a pulse is inductively generated, the position of which is fixed with respect to the wire grid and stored in memory.

In known digitizing styli of this type, when the contacting pin is pressed into the shaft of the digitizing stylus it moves into the center opening of the toroid coil, so that the intensity of the magnetic field transmitted by the contacting pin depends upon how far the contacting pin has been moved into the center opening upon the actuation of the switching device, or in other words, upon the excitation of the toroid coil. However, the contacting pin conventionally continues to move still farther into the center opening of the toroid coil after the actuation of the switching device before being arrested by a mechanical stop. Therefore, in known digitizing styli, an induction is generated for the wire grid which has a certain value upon the actuation of the switching device, but then increases as the displacement of the contacting pin continues. The result is a pulse in the wire grid, which deviates substantially from the rectangular form.

OBJECT AND SUMMARY OF THE INVENTION

It is accordingly the principal object of the invention to create a digitizing stylus which generates a pulse that is not dependent upon the spatial displacement of the contacting pin.

In order to attain this object, a digitizing stylus of the general type discussed above is embodied in accordance with the invention in such a manner that the toroid coil can be moved axially, together with the contacting pin. This preferably is attained by providing that the contacting pin and the toroid coil are integrally cast in plastic, and that the plastic body thereby formed has an extension on its inner end which extends inside an actuation body held within the shaft of the digitizing stylus, in an axially movable manner.

Thus, in the digitizing stylus according to the invention, the contacting pin and the toroid coil are held in an invariable position with respect to one another, so that upon the excitation of the toroid coil, regardless of the spatial position of the contacting pin with respect to the other parts of the digitizing stylus, a magnetic field of uniform size is always carried by the contacting pin. Hence, a pulse of constant amplitude is always generated in the wire grid or received by the wire grid, as the case may be.

The actuation body may have an annular flange on its inner end, on which flange one end of a compression spring is supported. The other end of the spring rests on an annular body which is held stationary. Thus, if there is no pressure on the outer end, the plastic body containing the contacting pin and the toroid coil is pressed forward into its position of rest, in which the switching device is not actuated.

In order to avoid mechanical contacts, which are subject to wear, in the switching device, this device may have a leaf shutter which moves in accordance with the axial displacement of the contacting pin; the leaf shutter is provided with a bore and extends between the transmitter and the receiver as a selective light barrier. When the contacting pin has been axially displaced into the shaft of the digitizing stylus, this bore is located in the vicinity of the light beam, so that light strikes the receiver and the toroid coil is excited, while in other positions the leaf shutter prevents light from the transmitter from striking the receiver.

In order to indicate the activation of the digitizing stylus, i.e., the excitation of the toroid coil, and thus to enable the user to monitor the operation, digitizing styli are often equipped with a light-emitting diode, visible through its outer wall, which lights up when the toroid coil is excited. This lighting up of the light-emitting diode can be seen particularly well if the area of the wall of the digitizing stylus covering the light-emitting diode is embodied as an acrylic resin window, extending symmetrically in the circumferential direction with respect to the light-emitting diode and encompassing from approximately 30° to approximately 60° and preferably 45° of the circumference. An acrylic resin window of this kind causes a distribution of the light of the light-emitting diode, so that the result is the optical impression of a clearly visible band of light.

The invention will be described in more detail below, referring to the drawings showing one exemplary embodiment.

BRIEF DESCRIPTION OF THE DRAWINGS

FIG. 1, in schematic form, shows a section taken through a digitizing stylus; and FIG. 2 shows a section taken along the line A-B 5 of FIG. 1.

DESCRIPTION OF THE PREFERRED EMBODIMENT

The digitizing stylus 1 shown has a front part 5 and a tubular part 6, which are put together, and glued if need be, to form the actual holder shaft. In the vicinity of the front part 5, a tubular actuation body 8 is located therein, being held with the aid of a screw 7 extending transversely through the wall of the front part 5 and into a slit 24, which is open at its inner end, in the wall of the actuation body 8. At the inner end of the actuation body 8, there is an annular flange 9 on which a compression spring 11 is supported. The other end of this compression spring 11 is located in an annular groove of an annular body 12, which is secured on the inner wall of the tubular part 6. In the position of the actuation body 8 shown in FIG. 1, which is determined by the spring 11, the front end of the actuation body 8 rests on an annular shoulder of the front part 5, and the screw 7 protruding into the slit 24 prevents the actuation body 8 from twisting in the circumferential direction.

An extension 14 of a plastic body 4 is inserted into the outer end of the central bore of the actuation body 8 and is held there, either by being glued or by a press fit. A toroid coil 3 is embedded in the plastic body 4 and its connection wires 13, which are shown schematically, are passed through the central bore of the actuation body 8. A contacting pin 2 of ferromagnetic material is also embedded in the plastic body 4, being disposed coaxially with respect to the toroid coil 3 and with its inner end area protruding into the interior of the toroid coil. The outer end of the contacting pin 2 is located near the tip of the plastic body 4, which in this region is embodied in the shape of a cone.

The connection wires 13 of the toroid coil 3 extend from the central bore of the actuation body 8 into the central bore of a connecting tube 10, which is secured in the inner end of the actuation body 8 and extends through the annular body 12 in an axially movable manner. A leaf shutter 15 is secured on the inner end of the connecting tube 10, and extends between the transmitter 16 and the receiver 17 to define a light barrier and has a bore, which is not shown. The transmitter 16 and the receiver 17 portion of the light barrier are held on a carrier body 19, which is pushed into the tubular part 6 from the posterior end and held by means of screws 20. The cable 18 containing the various electrical lines is carried to the outside through this carrier body 19. In order to cover the screws 20, a tubular covering 21, which by way of example is of acrylic resin, is pushed onto the posterior end.

During operation, the digitizing stylus is placed with the tip of the plastic body 4 against a drawing disposed on a digitizing table. At a point which is to be stored in memory, the shaft of the digitizing stylus is pressed down in the direction of the drawing, causing the plastic body 4 together with the actuation body 8 and the connecting tube 10 to be pressed axially into the shaft until the bottom of the slit 24 in the actuation body 8 rests on the screw 7. As a result of this displacement, the bore (not shown) in the leaf shutter body 15 moves between the transmitter 16 and the receiver 17 to remove the light barrier, and a switching signal then is generated and a measurement cycle triggered thereby. The transmitted or received magnetic field does not undergo any changes here, because no change takes place in the relative position of the ferromagnetic contacting pin 2 and the toroid coil 3 during the actuation movement.

Once the exciter current circuit is closed, the diode 22 (FIG. 2) also lights up. An acrylic resin window 23 is provided in the tubular part 6 in the vicinity of this diode 22. In the circumferential direction, this window 23 is embodied symmetrically with respect to the light-emitting diode 22, and it extends over approximately 45° of the circumference. Accordingly, when the diode lights up, the result is a clearly visible band of light in the vicinity of the acrylic resin window 23.

If the digitizing stylus is raised from the drawing once again, then the spring 11 presses the annular flange 9 of the actuation body 8, and thus both the plastic body 4 and the connecting tube 10, back into the position shown in FIG. 1.

Having now described a preferred embodiment of my invention, the invention is to be defined solely by the scope of the appended claims.

I claim:

1. In a digitizing stylus of the type having a holder shaft comprised of a front part and a tubular part and elongated in an axial direction and a contacting pin of ferromagnetic material movable in the axial direction within said front part of the stylus and counter to spring force, in a manner where said movement is limited in the axial direction, and the contacting pin has an inner end area which is oriented toward the tubular part and extends for said movement through the central opening of a toroid coil and is coupled with a switching device, whereupon the movement of the contacting pin into the shaft closes a current circuit for the toroid coil, wherein the improvement comprises, in combination, a toroid coil (3) which axially moves together with a contacting pin (2) characterized by the contacting pin (2) and toroid coil (3) being integrally cast within a plastic body (4), said plastic body having an inner end in contact with an actuation body (8), said actuation body having an inner end comprising an annular flange (9) supporting one end of a compression spring (11), with another end of the spring resting upon an annular body (12) which is held stationary with respect to said tubular part, a switching device which closes at a first axial position of said actuation body, prior to an inwardmost stop position and remains closed during further inward movement to a second axial position, at said inwardmost stop.

2. A digitizing stylus as defined by claim 1, characterized in that the switching device further comprises a leaf shutter (15), connected to an inner end of a connecting tube extending inwardly from the inner end of said actuating body, so as to move in accordance with the axial displacement of the contacting pin (2), said leaf shutter having a bore and adapted to extend between a transmitter (16) and a receiver (17) selectively to define a barrier to a light beam, whereby when the contacting pin (2) has been axially displaced into the holder shaft (5, 6) of the digitizing stylus between said first and second positions, the bore is located in the vicinity of and passes the light beam between transmitter and receiver (16, 17).

3. A digitizing stylus as defined by claim 1, further comprising a light-emitting diode, connected to said switching device to indicate axial locations of the contact pin between said first and second positions, which is within the tubular part and visible through a wall portion of the stylus tubular part, characterized in that an area of the wall proximate the light-emitting diode (22) comprises an acrylic resin window (23) extending symmetrically with respect to the light-emitting diode (22) in the circumferential direction and encompassing approximately 30 degrees to approximately 60 degrees, and preferably 45 degrees, of the circumference.

4. A digitizing stylus as defined by claim 2, further comprising a light-emitting diode, connected to said switching device to indicate axial locations of the contact pin between said first and second positions, which is within the tubular part and visible through a wall portion of the stylus tubular part, characterized in that an area of the wall proximate the light-emitting diode (22) comprises an acrylic resin window (23) extending symmetrically with respect to the light-emitting diode (22) in the circumferential direction and encompassing approximately 30 degrees to approximately 60 degrees, and preferably 45 degrees, of the circumference.

* * * * *